(12) United States Patent
Braeuer

(10) Patent No.: US 9,089,925 B2
(45) Date of Patent: Jul. 28, 2015

(54) MAGAZINE FOR ELECTRODE CAPS

(75) Inventor: Andreas Braeuer, Thermalbad Wiesenbad OT Schönfeld (DE)

(73) Assignee: Braeur Systemtechnik GmbH, Thermalbad Wiesenbad OT Schoenfeld (DE)

( * ) Notice: Subject to any disclaimer, the term of this patent is extended or adjusted under 35 U.S.C. 154(b) by 848 days.

(21) Appl. No.: 13/384,375

(22) PCT Filed: Nov. 25, 2010

(86) PCT No.: PCT/EP2010/007144
§ 371 (c)(1),
(2), (4) Date: Jan. 17, 2012

(87) PCT Pub. No.: WO2011/082734
PCT Pub. Date: Jul. 14, 2011

(65) Prior Publication Data
US 2012/0118790 A1    May 17, 2012

(30) Foreign Application Priority Data

Dec. 17, 2009 (DE) .......................... 10 2009 058 937

(51) Int. Cl.
*B23K 11/30* (2006.01)
*B65D 1/00* (2006.01)
*B65D 81/00* (2006.01)
*B65D 23/00* (2006.01)
*B23Q 3/155* (2006.01)

(52) U.S. Cl.
CPC ........ *B23K 11/3072* (2013.01); *B23Q 3/15526* (2013.01); *B23Q 3/15566* (2013.01); *B65D 1/00* (2013.01); *B65D 23/00* (2013.01); *B65D 81/00* (2013.01)

(58) Field of Classification Search
USPC ........................................................ 269/37
See application file for complete search history.

(56) References Cited

U.S. PATENT DOCUMENTS 4,033,539 A * 7/1977 Bardocz ................... 248/228.6
4,654,964 A * 4/1987 Schneider et al. .............. 29/705
(Continued)

FOREIGN PATENT DOCUMENTS

| CA | 2395598 A1 | 8/2001 |
| EP | 2 085 172 A1 | 8/2009 |
| JP | 2006-68787 A | 3/2006 |

*Primary Examiner* — Lee D Wilson
*Assistant Examiner* — Alvin Grant
(74) *Attorney, Agent, or Firm* — Laurence A. Greenberg; Werner H. Stemer; Ralph E. Locher

(57) ABSTRACT

A magazine for electrode caps of welding electrodes, in particular for welding tongs of welding robots, includes a magazine head and a changer magazine. A quick-action coupling unit connects the changer magazine to the magazine head, and at least one interlocking guide device is arranged on the magazine head and on the changer magazine. The electrode caps to be kept available for supply are stored in the changer magazine in two cap guides. The cap guides are diagonally offset in the changer magazine and magazine head. A magazine closure mechanism is arranged on the side of the changer magazine facing the magazine head, and the side of the magazine head facing away from the changer magazine is opened in the form of an aperture sufficiently far in the access direction of the welding tongs to expose the full diameter of the electrode cap aperture positioned in the access direction.

9 Claims, 5 Drawing Sheets

(56) References Cited

U.S. PATENT DOCUMENTS

| | | | |
|---|---|---|---|
| 5,767,474 A * | 6/1998 | Shimada | 219/86.8 |
| 6,327,929 B1 * | 12/2001 | Yanagisawa | 74/490.09 |
| 7,105,767 B2 * | 9/2006 | Izumi et al. | 219/86.8 |
| 7,966,706 B2 | 6/2011 | Fukizawa et al. | |
| 8,308,025 B2 * | 11/2012 | Nakajima et al. | 221/209 |
| 2003/0106878 A1 | 6/2003 | Sundstrom | |
| 2006/0101630 A1 * | 5/2006 | Nakajima et al. | 29/267 |

* cited by examiner

MAGAZINE FOR ELECTRODE CAPS

BACKGROUND OF THE INVENTION

Field of the Invention

The invention relates to a magazine for electrode caps of welding electrodes, in particular for welding tongs of welding robots.

In the automobile industry in particular, spot-welding is a frequently used method to connect metal sheet and strip in motorcar body production on automated production lines.

It is a usual procedure to use welding robots which have the purpose of connecting the motorcar body parts in a spot-welding process. These welding robots are provided with welding tongs, and each of the tong jaws is equipped with a spot-welding electrode, the so-called electrode caps.

These welding tongs are approached to the sheet plates to be welded together which are in their proper positions. The accurate positioning of the welding tongs in relation to the sheets to be welded together, and the arrangement of the sheets in relation to each other is done by automated and computer-aided processes.

Such an automated production line will yield high-speed fixed-cycles and uninterrupted welding operations.

The electrode caps used in such processes are subjected to high wear and tear as the contact surfaces of the electrode caps will make contact with the motorcar body sheet parts which are welded to each other.

During such a welding process, electric current flows between the electrodes and thus through the motorcar body sheets which are welded together and in close contact already.

The contact surfaces of the electrode caps will undergo changes in the zones where the welding process takes place. For example, the electrodes are often burned away at the edge area of the contact surfaces, the material building up and increasing the contact surface and thus changing the welding conditions.

To avoid an uneconomical tracking and controlling of the current intensity due to such changes, the electrode caps are regularly remilled depending on the loads applied to them and the resulting wear and tear.

In most cases, electrodes which interact on one and the same welding tongs, will present identical wear results so that there is a need of reworking them by milling regularly and simultaneously.

After a number of milling operations, however, the material consumed at the electrode caps is reduced so strongly that they must be replaced. This is done by pulling the worn electrode caps off the welding electrode adapters.

You normally use magazines of a simple design to feed the welding electrode adapters with new, unconsumed electrode caps. The magazines are arranged in a way so as to help the welding tongs take up new electrode caps in a defined position and define them in their positions on the welding electrode adapter by pushing the jaws of the welding tongs together. Since it is necessary to arrange the magazines in a defined position to be accessible for the welding tongs, the magazines may not leave their positions thus requiring manual refilling of the magazines at the site of welding work.

Generally, the welding process must be interrupted as no refilling can take place during the process proper is possible for security reasons as no persons are allowed to be present or walk into the range of action of active robots.

To counteract this disadvantage, it was tried to exchange the magazines. But this is no improvement of the fact that the process must be interrupted as the coordinates of the welding tongs movement must be reprogrammed after every installation of a new magazine.

The invention is based on the requirement to offer a magazine for electrode caps which avoids the difficulties of the known solutions as far as possible, and especially ensures that process reliability and safety is maintained.

BRIEF SUMMARY OF THE INVENTION

This requirement is met according to the invention by a device of the invention presented in the claims. The system is depicted in the figures and the following exemplary embodiment (which is not to be construed as limiting).

DESCRIPTION OF THE INVENTION

Figure 1:
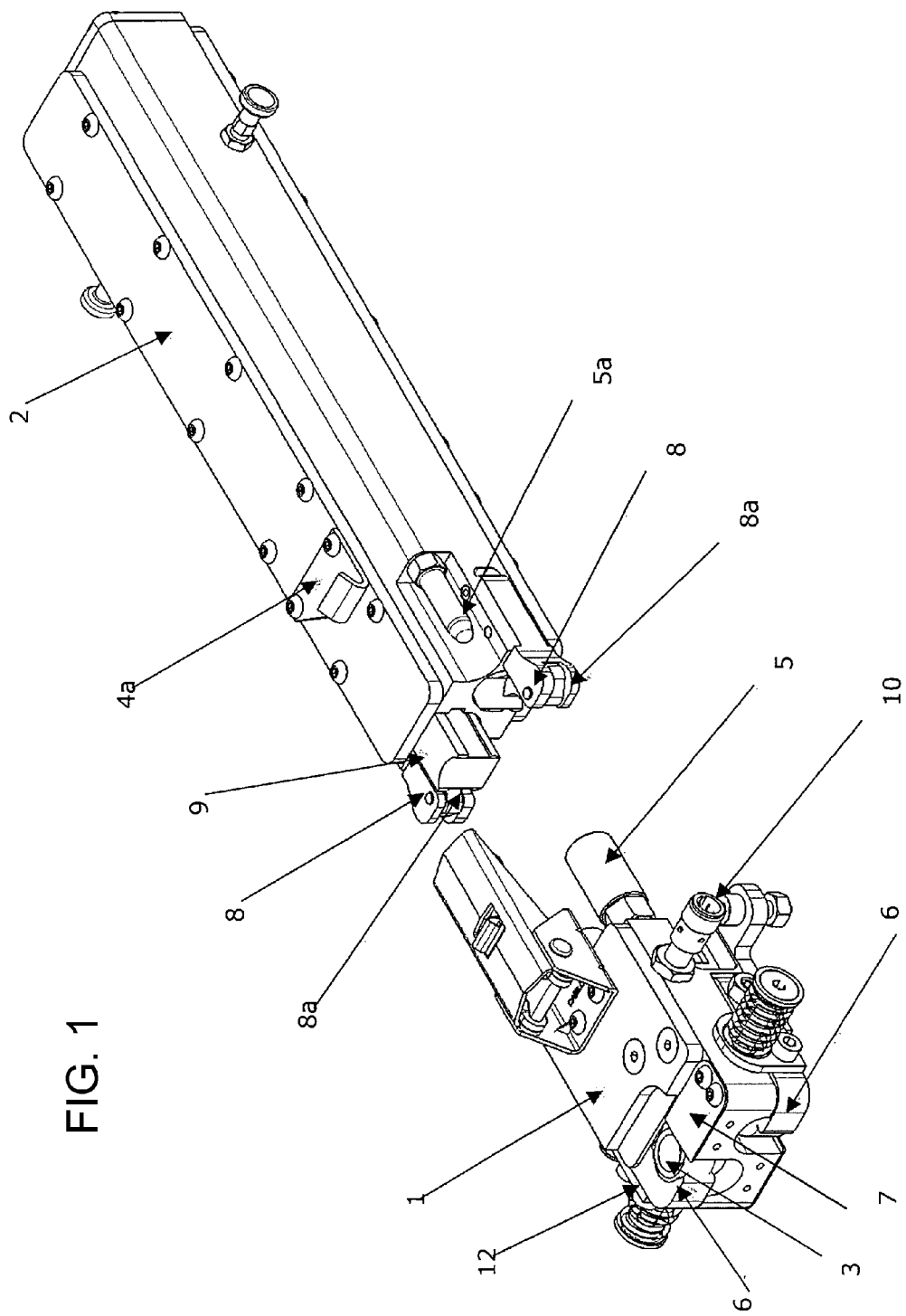
FIG. 1 shows the magazine of the invention in its decoupled condition.
Figure 2:
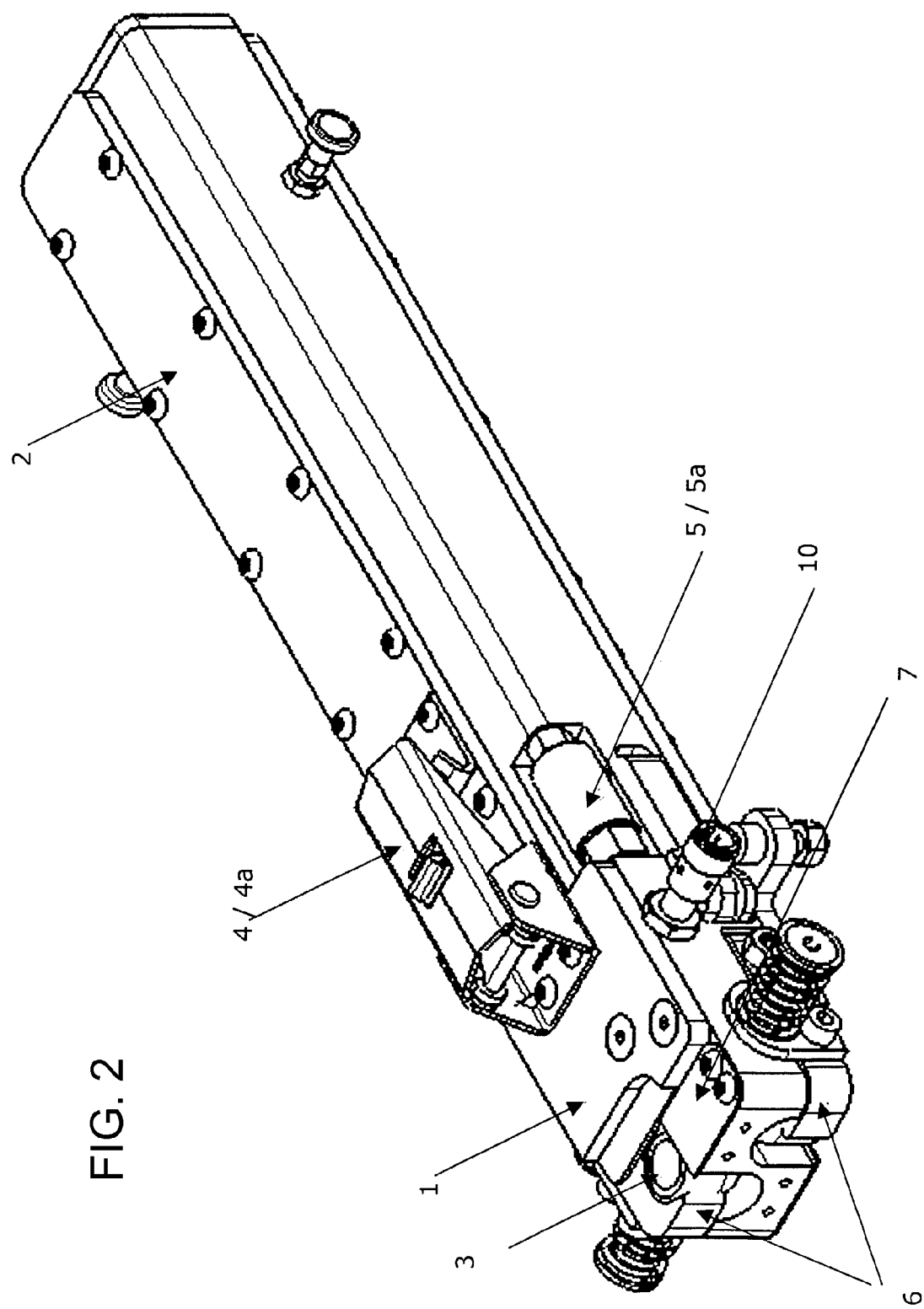
FIG. 2 shows the magazine of the invention in its coupled condition.
Figure 3:
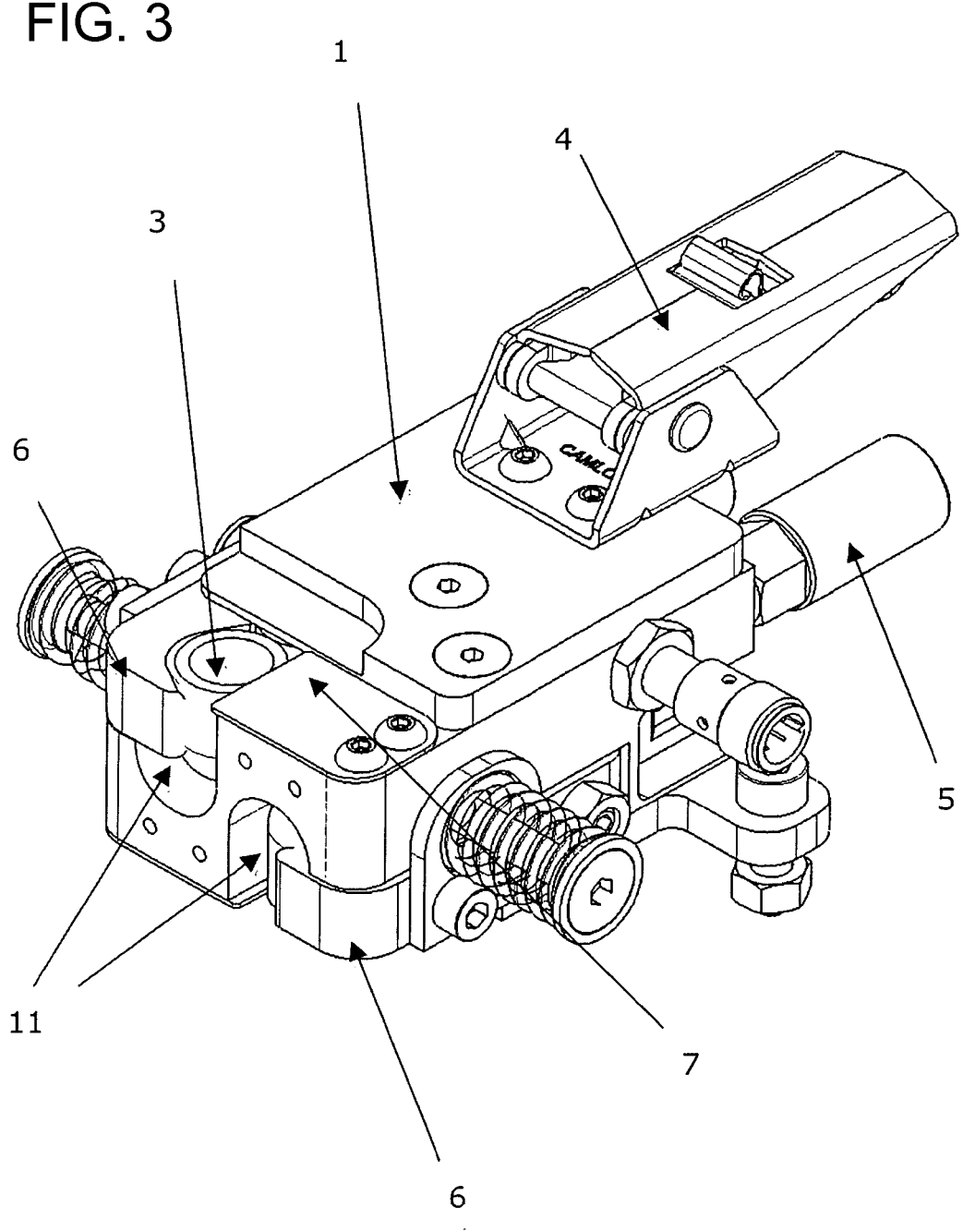
FIG. 3 shows the magazine head 1.
Figure 4:
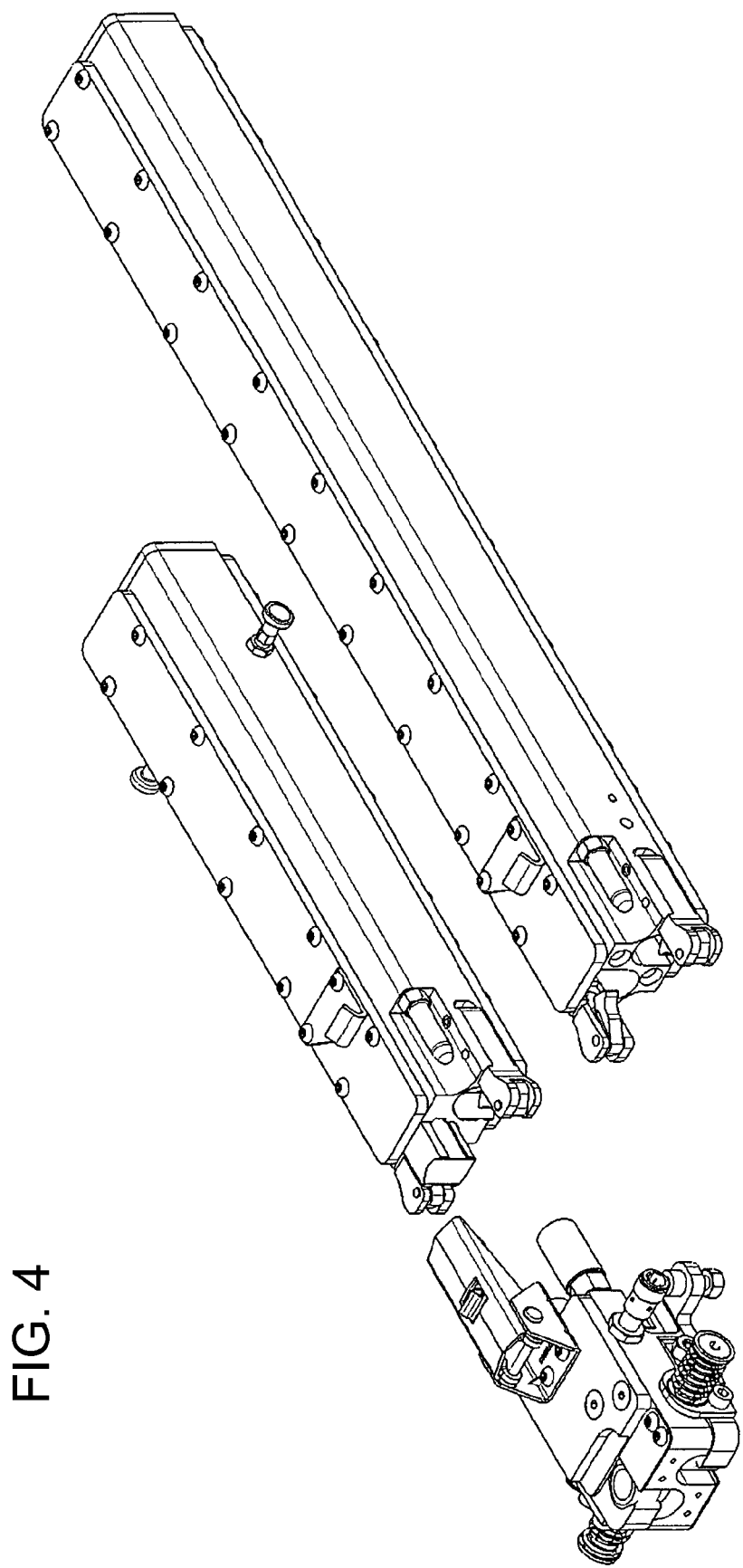
FIG. 4 the changer magazine in a number of sizes.
Figure 5:
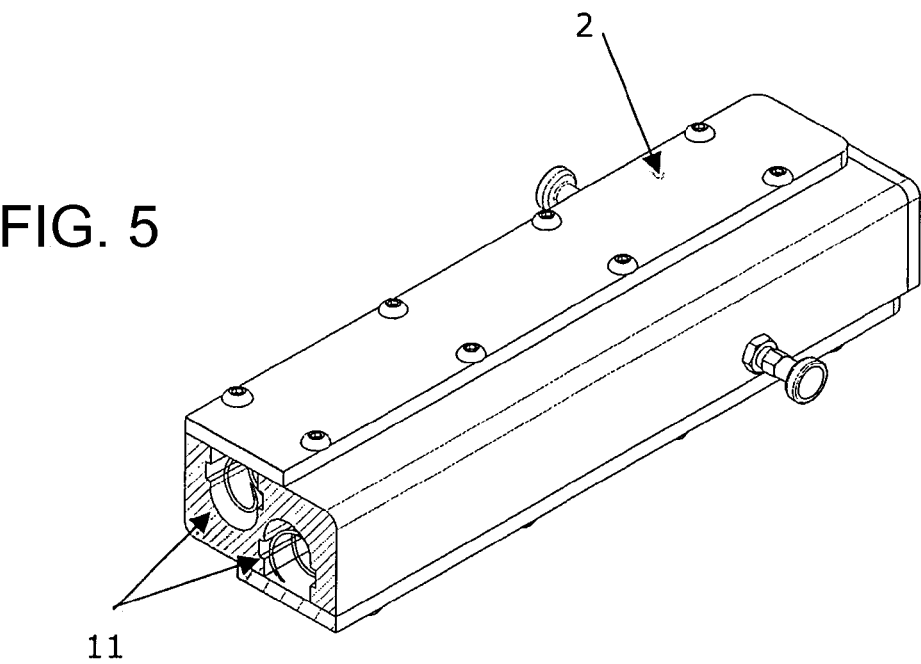
FIGS. 5 and 6 show a cross-section and longitudinal section of the changer magazine.
Figure 6:
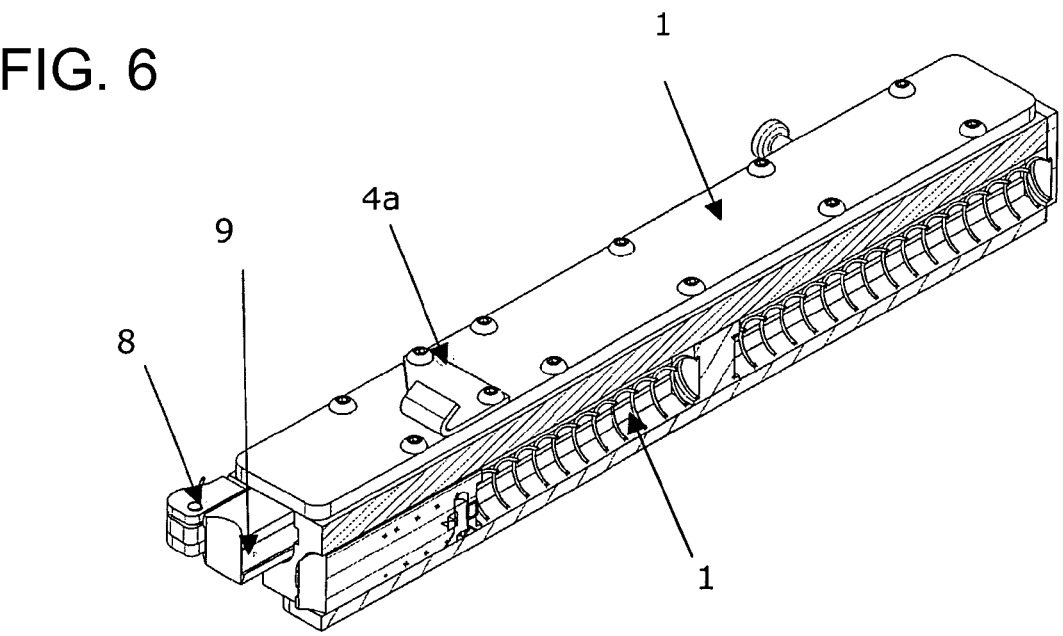

The magazine according to the invention consists of a magazine head 1 and a changer magazine 2.

A quick-action coupling unit (4 and 4a) is provided in order to connect the changer magazine 2 to the magazine head 1 such that the clamping device 4 is located on the magazine head 1 and the clamping hook 4a on the changer magazine 2. Such an arrangement has a reasonable technical purpose as the force with which the clamping device 4 is activated has the same direction as the force applied to the changer magazine 2 will be directed towards the magazine head 1 and thus the sense of its functional position.

At least one guide unit is arranged to ensure that the magazine head 1 and the change magazine 2 are held in a defined position when the two subassemblies are coupled. In this embodiment of the design the guide unit has a shape so as to ensure that at least one guide mandrel 5a engages into a guide bush 5.

The two guide elements, guide bush 5 and guide mandrel 5a, have such a preferred form and dimensional tolerance that they can easily be engaged to each other and the defined position of the magazine head 1 and changer magazine 2 in relation to one another is nevertheless maintained.

The electrode caps to be kept available for supply are stored in the changer magazine 2 in two cap guides 11, the cap guides being designed parallel to the longitudinal axis of the changer magazine 2 and in identical positions in relation thereto in the magazine head 1. The cap guides 11 are introduced diagonally offset in the changer magazine 2 and magazine head 1 such that the contact surfaces of the electrode caps are diagonally opposed to each other.

This arrangement of the electrode caps 3 in the changer magazine 2 and magazine head 1, where the aperture of the electrode caps 3 faces towards outside, enables the welding tongs to engage with their electrode adapters into the electrode caps 3 in order to pick the electrode caps 3 up. The diagonally offset arrangement of the cap guides 11 in the cross-section of changer magazine 2 and magazine head 1 was chosen so as to achieve a minimized size of the complete unit, because the height of the equipment will thus be smaller than the height of two caps placed opposite in addition to the wall thickness of the separating wall of the two cap guides.

The cross-sections of cap guides 11 are designed so as to allow the transport of the electrode caps 3 with minimal force and also to prevent the caps 3 from jamming inside the cap guides 11 and especially at the connecting point between changer magazine 1 and magazine head 1. This is achieved by designing the cap guides 11 in the same shape as the electrode caps 3 plus sufficient tolerances.

This creates the requirement that the cap guides 11 in the changer magazine 2 and magazine head 1 should also match each other, depending on the shape of the electrode caps 3. By preference, the magazine head 1 and the changer magazine 2 are designed from a profile which also contains the integrated cap guide 11. This section will be cut to the required length of each magazine for the production of different magazine lengths.

The cap guides 11 of the magazine head 1 and changer magazine 2 are closed with locking mechanisms which may by preference be manufactured from sheet metal. The side of the changer magazine 2 which is opposite to the magazine lock 8 and 8a will be by preference closed with an identical mechanism. A magazine lock 8 is arranged on the side of the changer magazine 2 which faces the magazine head 1. This magazine lock 8 prevents the electrode caps 3 from being pushed out of the changer magazine which has not yet been plugged on, by application of the force which is applied to electrode caps in the changer magazine to push them towards the magazine head.

According to the embodiment this magazine lock 8 is designed so as to retain the electrode caps 3, which are stored in the changer magazine 2 and are pushed towards the magazine head 1 by a preferably spring-loaded cap feeder 9, by locking lever 8a.

The locking levers 8a are preferably positioned by spring action so as to reduce the aperture of the cap guide 11 to such an extent that the electrode caps 3 can not come out.

When the changer magazine 2 is placed on to the magazine head 1, the locking levers 8a of the magazine closure mechanism 8 are moved by the guides arranged at the magazine head 1 which act against the spring force applied by the locking levers 8a, to a position in which the aperture of the cap guide 11 facing the magazine head 1 is opened and the electrode caps 3 can be transferred into the cap guide 11 of the magazine head.

The electrode caps 3 are transferred to the electrode adapters of the welding tongs on the side of the magazine head 1 facing away from the changer magazine 2. To this effect, the cap guides 11 are opened sufficiently far in the access direction of the welding tongs so as to expose the full diameter of one welding cap 3 with its aperture positioned in the access direction. In order to fix the electrode caps 3 in said position, at least one clamping jaw 6 is arranged for each cap guide.

These clamping jaws 6, which are spring-loaded in the present embodiment, fix the electrode caps 3 until they are picked up by the electrode adapter's engagement.

Once the electrode adapter is introduced in the electrode cap 3 by the closing action of the welding tongs in the correct position, the electrode cap 3 is pulled out of the cap guide 11 in the direction of the course of the cap guide 11 by the magazine head 1. The spring force applied to the clamping jaw 6 is overcome, and the electrode cap 3 is released.

By preference, a pressure plate 7 is arranged opposite of the respective transfer aperture 12 in the magazine head 1. Said pressure plate 7 acts like a counter-bearing for the second leg of the welding tongs which has not yet been charged with a new cap 3, pressing the picked-up electrode cap 3 on to the electrode adapter with the specified force.

Example: if welding tongs pick up from above an electrode cap 3 from a magazine head 1, as depicted in the Figures by a first step, the pressure plate 7 located at the bottom acts as a counter-bearing for the electrode adapter, which has no electrode on it, when the welding tongs are closed; by another step, the electrode cap is picked up for the second lower electrode adapter, which has no electrode on it, the closing of the welding tongs now having the effect that the upper pressure plate 7 acts as a counter-bearing.

In order to monitor the filling level of the magazine, it is reasonable to equip this apparatus with corresponding control instruments. It is proposed to provide a monitoring device making use of a proximity sensor which is arranged at the connection 10 provided by the embodiment.

With this arrangement, it is possible to transmit a signal to the operator with the request for him to change the magazine 2 once the sensor detects the absence of a first cap 3. The operator would be enabled to already prepare the changing of the magazine 2 while some electrode caps are still in the magazine head 1.

In summary, the invention described herein relates to a magazine for electrode caps of welding electrodes, in particular for welding tongs of welding robots, consisting of a magazine head (1) and a changer magazine (2) to be connected to said magazine head (1). A quick-action coupling unit (4 and 4a) is provided in order to connect the changer magazine (2) to the magazine head (1), and at least one interlocking guide device (5 and 5a) is arranged on the magazine head (1) and on the changer magazine (2). The electrode caps (3) to be kept available for supply are stored in the changer magazine (2) in two cap guides (11), which have a profile that corresponds to the shape of the electrode caps (3) and which are designed parallel to the longitudinal axis of the changer magazine (2) and in identical positions in relation thereto in the magazine head (1). Said cap guides (11) are introduced diagonally offset in the changer magazine (2) and magazine head (1) such that the contact surfaces of the electrode caps (3) are diagonally opposed to each other, a magazine closure mechanism (8) is arranged on the side of the changer magazine (2) facing the magazine head (1), and the side of the magazine head (1) facing away from the changer magazine (2) is opened in the form of an aperture (12) sufficiently far in the access direction of the welding tongs so as to expose the full diameter of the electrode cap (3) aperture positioned in the access direction. In order to fix the electrode cap (3) in said position, at least one clamping jaw (6) is arranged for each cap guide, and adjacent to each transfer aperture (12) in the magazine head (1) and on the housing of the magazine head, a pressure plate (7) is arranged opposite of the respective other aperture (12).

The invention claimed is:

1. A magazine for electrode caps of welding electrodes, comprising:
   a magazine head and a changer magazine to be connected to said magazine head;
   a quick-action coupling unit for connecting said changer magazine to said magazine head;
   at least one interlocking guide device respectively disposed on said magazine head and on said changer magazine;
   said changer magazine having two cap guides formed therein for keeping available electrode caps for supply, said guides having a profile corresponding to a shape of the electrode caps and extending parallel to a longitudinal axis of said changer magazine;

said magazine head having cap guides formed therein in corresponding positions relative to said cap guides in said changer magazine, said cap guides in said magazine head and said changer magazine being diagonally offset from one another such that contact surfaces of the electrode caps are diagonally opposed to each other; and a magazine closure mechanism disposed on a side of said changer magazine facing said magazine head, and a side of said magazine head facing away from said changer magazine being open with an aperture sufficiently far in an access direction of welding tongs so as to expose a full diameter of the electrode cap aperture positioned in an access direction; and at least one clamping jaw for each said cap guide and for fixing the electrode cap in position, and a pressure plate adjacent to a transfer aperture in said magazine head and on the housing of said magazine head and opposite to a respectively other said aperture.

2. The magazine according to claim 1, configured for welding tongs of welding robots.

3. The magazine according to claim 1, wherein said guide device comprises a guide bush and a guide mandrel engaging into said guide bush.

4. The magazine according to claim 3, wherein said guide bush and said guide mandrel are configured for easy engagement with one another, yet for maintaining a defined position of said magazine head and said changer magazine in relation to one another.

5. The magazine according to claim 1, which comprises a magazine lock configured to retain the electrode caps which are kept available for supply in said changer magazine and which are pushed towards said magazine head in said changer magazine.

6. The magazine according to claim 5, wherein the electrode caps are pushed towards said magazine head by a spring-loaded cap feeder and are retained in said changer magazine by a locking lever.

7. The magazine according to claim 6, wherein said locking lever is spring-loaded and an exit aperture of said cap guide is reduced to such an extent that the electrode caps cannot come out.

8. The magazine according to claim 1, wherein the cap guides in said changer magazine and in said magazine head have a cross-section adapted to the shape of the electrode caps so as to facilitate a transfer of the electrode caps and to prevent jamming thereof in said cap guides and particularly at a connecting point between said changer magazine and said magazine head.

9. The magazine according to claim 1, which comprises at least one sensor for monitoring a filling level of said changer magazine.

\* \* \* \* \*

UNITED STATES PATENT AND TRADEMARK OFFICE
CERTIFICATE OF CORRECTION

PATENT NO. : 9,089,925 B2  
APPLICATION NO. : 13/384375  
DATED : July 28, 2015  
INVENTOR(S) : Andreas Braeuer Page 1 of 1

It is certified that error appears in the above-identified patent and that said Letters Patent is hereby corrected as shown below:

Title Page

Item (73) Assignee should read:

--(73) Assignee: Braeuer Systemtechnik GmbH, Thermalbad Wiesenbad OT Schoenfeld (DE)--.

Signed and Sealed this
First Day of December, 2015

Michelle K. Lee
*Director of the United States Patent and Trademark Office*